United States Patent [19]

Smith-Johannsen

[11] Patent Number: 4,618,369

[45] Date of Patent: Oct. 21, 1986

[54] OIL-IN-WATER SUSPENSIONS AS ADDITIVES FOR CEMENTS

[75] Inventor: Robert Smith-Johannsen, Incline Village, Nev.

[73] Assignee: Ramu International, Incline Village, Nev.

[21] Appl. No.: 684,556

[22] Filed: Dec. 21, 1984

Related U.S. Application Data

[62] Division of Ser. No. 418,790, Sep. 16, 1982, abandoned.

[51] Int. Cl.$^4$ .................................................. C04B 24/08
[52] U.S. Cl. ...................................... 106/95; 106/90; 106/107; 106/314
[58] Field of Search ................... 106/95, 107, 314, 90

[56] References Cited

U.S. PATENT DOCUMENTS

| | | | |
|---|---|---|---|
| 1,724,945 | 8/1929 | Lukens | 106/107 |
| 2,071,263 | 2/1937 | Phillips | 106/95 |
| 3,865,601 | 2/1975 | Serafin et al. | 106/90 |
| 3,976,582 | 8/1976 | Douglas et al. | 252/8.55 D |
| 4,352,694 | 10/1982 | Smith-Johannsen | 106/106 |
| 4,375,987 | 3/1983 | Lange et al. | 106/95 |
| 4,392,917 | 7/1983 | Lipowski et al. | 162/168.1 |

FOREIGN PATENT DOCUMENTS

| | | | |
|---|---|---|---|
| 810102 | 4/1969 | Canada | 252/311.5 |
| 915712 | 11/1972 | Canada | 106/95 |

OTHER PUBLICATIONS

Rosen, *Surfactants and Interfacial Phenomenon,* Wiley-Interscience, New York, N.Y. (1978) pp. 260, 266-227.
Riddick, *Control of Colloid Stability through Zeta Potential,* Zeta Metal Inc. (1968) pp. 2-6.

*Primary Examiner*—William R. Dixon, Jr.
*Assistant Examiner*—Steven Capella
*Attorney, Agent, or Firm*—Pennie & Edmonds

[57] ABSTRACT

The invention relates to a process for forming a cement composition which comprises mixing hydratable cement particles, water and an oil-in-water suspension wherein the oil droplets of the suspension are surrounded by colloidal particles having a zeta potential of between about +18 and −18 millivolts, and allowing the mixture to cure.

24 Claims, No Drawings

OIL-IN-WATER SUSPENSIONS AS ADDITIVES FOR CEMENTS

This is a division of application Ser. No. 418,790 filed Sept. 16, 1982, now abandoned.

BACKGROUND OF THE INVENTION

Oil-in-water (o/w) or water-in-oil (w/o) dispersions are not stable. Although a dispersion can be obtained by high shear mixing of two incompatible liquids, such as oil and water, they soon separate and form distinct phases. In order to stabilize such dispersions to render them of practical use, an agent is added to the suspension which prevents the dispersed phase particles from coalescing. These agents are generally called emulsifying agents and thus stable dispersions are often referred to as emulsions. Surfactants and dispersants are terms also used for such agents. The terms are often loosely used in the art, but the end effect of such agents is the stabilization, at least to some degree, of a particle, whether it be a solid or liquid particle, dispersed in an incompatible liquid.

Generally, o/w or w/o dispersions are made stable by a combination of surfactants which provide the necessary hydrophilic-hydrophobic balance and a high surface charge so that the internal phase particles or droplets are prevented from a critical close approach to one another, thus avoiding coalescence. Small sized and highly charged particles or droplets are inherent in these dispersions, and they are highly stable. However, the high stability of these emulsions severely limits their usefulness for many applications, such as for treatment of surfaces or as coatings. These emulsions when applied to a surface, in effect, sit on top of the surface with little penetration into the surface. They remain in emulsified form and are broken to deposit the desired phase onto the surface generally by evaporation of the external phase. The high stability of these o/w dispersions also often results in undesirable water sensitivity. With these prior-art emulsions, it is necessary to have a high charge in order to create stability. The zeta potential of the particles in common emulsions is generally in the order of about 60 to 100 millivolts (mv).

SUMMARY OF THE INVENTION

This invention relates to stable o/w and w/o dispersions in which the dispersed particles have a very low surface charge which can be either negative or positive as may be desired. The stable dispersions do not require the usual ingredients which impart water sensitivity to the applied treatments or coatings. The dispersions are formed by reaction of appropriate proportions of both an anionic and cationic agent or polymer in the liquid used to form one phase of the dispersions. The reaction of the soluble anionic and cationic agents in water forms a solid colloidal particle dispersion. The internal phase, such as an oil, is added to the colloidal dispersion thus formed and is easily dispersed therein to form the stable dispersions having low particle surface charges according to this invention. The colloidal particles coagulate and surround the oil particles to form aggregate particles. No other additives are required. The initial net charge of the incompatible internal phase particle or aggregate is established by the proportions of anionic or cationic agents used to form the colloidal dispersion to which the internal phase is added. In this manner it is possible to make shelf-stable o/w or w/o dispersions which can "plate out" or "exhaust" on to various low charged surfaces to which they are applied. In other words, when the emulsions of this invention are applied to the appropriate surface, they break on contact with the surface, the oil phase plates out and adheres to the surface, and the water phase, now incompatible, can easily be removed. For example, the application of a linseed oil-in-water emulsion to an automobile painted surface immediately plates out on the surface leaving beads of water on top which can be removed simply by wiping the surface with a cloth. The dispersion can also be made to act selectively or various surfaces by adjustment of the charges. An o/w dispersion of silicone oil or linseed oil can be made with a very low negative charge so that a dilute suspension of this dispersion will exhaust and bond tenaciously to a hydrophobic surface, such as automobile paint, lacquer and wood while at the same time being repelled from a glass surface, such as a windshield, thus developing a weather protecting coating on paint or wood while at the same time maintaining the highly desirable water wettable surface on the glass.

The term particle as used herein means a liquid particle which is surrounded by or is attached to solid particles. The aggregate particle comprising both the liquid droplet and the attached or surrounding solid particles has a charge eminating from its surface in the same manner that completely solid suspended particles have charges.

As stated above, the net charge of the particle aggregates according to this invention are low. The particle aggregates have an average zeta potential between about $+18$ and $-18$ millevolts (mv). Experiments to date indicate that some of the more advantageous properties of the suspensions or emulsions begin to diminish when the zeta potentials exceed about $+10$ or $-10$ mv. At around $+18$ and $-18$ mv, the emulsions become too stable, resemble ordinary emulsions and will not "plate" out. At around $+8$ and $-8$ mv, the aggregates tend to contact each but do not tend to coalesce. The most advantageous dispersions found to date are those wich have a zeta potential surface charge of essentially zero, slightly negative or slightly positive (between about 30 5 and $-5$ mv). When the latter conditions prevail, the particles are almost still in the zeta meter.

The particle size of the internal phase liquid droplet should be sufficiently large so that an effective amount of the colloidal particles will coagulate about them and adhere thereto to act as "bumpers" and prevent coalescence of the particles. No exact particle size has been determined in this regard. It is known, however, that very small particle size, such as 0.2 and 0.5 microns (the more common emulsion size particles) are too small and there is thus not enough "room" to properly "bumper" the particles at low charge to produce stable emulsions. A droplet particle size of about 25 microns has been found to be quite suitable. The exact particle size range could readily be determined by routine experimentation if one desired to enter into this exercise. This has not been done since it is not essential to the invention; the only essential factor being the generality discussed above, i.e., the particles should be of a sufficient size to permit the attachment of aggregate solid colloidal particles in sufficient amount to prevent agglomeration or coalescence of the internal liquid phase at low charges. One common manner of regulating particle size in conventional emulsions is by the energy input during formation of the emulsion. Generally, the higher the energy input, the smaller the size. In preparing the suspensions of this invention, however, energy input does not affect the particle size to any significant extent. High shear energy will initially decrease the particle size but the oil particles coalesce rapidly after removal of the energy to form larger particles or the particles will revert to their original size, probably because the low electrical force is not sufficient to sustain a stable small particle suspension. The extent of particle size is only limited by inversion. When the oil particles become too large, the suspension will invert to form o/w suspensions as is the case with usual emulsions. Thus, the particle size will depend mainly upon the particular oil employed, the concentration of the colloidal particle in the water, the size of the colloidal particles, etc., as will be apparent to those skilled in the art.

Various combinations of anionic and cationic agents can be used according to the invention so long as they are capable of interacting with each other in the water or oil phase of the suspension to form a colloidal solution having the appropriate charge or zeta potential. They can be originally water soluble, such as common emulsifying agents are, or water insoluble, such as a liquid (water) dispersed colloid. The agents can be organic or inorganic. Lists of various cationic and anionic agents are readily available from numerous chemical encyclopedias and texts; for example, see SURFACTANTS AND INTERFACIAL PHENOMENA by Milton J. Rosen, John Wiley & Sons (1978) pages 1 through 17. Some more specific anionic agents which are useful include the sodium salt of sulfonated naphthalene-formaldehyde condensates marketed by Diamond Shamrock Corporation under the name Lomar D; the sodium salt of sulfonated melamine-formaldehyde condensates marketed by Suddeutsch Kalkstrikkstoff-Werke, under the name Melment; a lignosulfonate sodium salt marketed by Crown Zellerbach under the name Orzan LS; and a sodium stabilized colloidal silica marketed by DuPont under the name Ludox HS Some specific examples of cationic agents which can be used include polyethylene imine marketed by Dow Chemical Company; polyvinyl benzo trimethylene ammonium chloride marketed by Dow Chemical Company under the name ECR-34 conductive resin; dicyandiamine-formaldehyde condensate (hydrochloride) marketed by Sun Chemical Corporation under the names Warcofix or Sunpro; and a stabilized cationic colloidal silica or silica sol marketed by DuPont under the name Ludox AM. The Ludox HS and AM are examples of water dispersed colloids. These silica colloids can be considered polymers, and they interact when mixed to form colloidal aggregate particles of low surface charge which surround the internal phase droplets in quite the same manner as the particles formed by the interaction of the soluble anionic and cationic agents do.

As previously discussed any combinations of these cationic and anionic polymers are effective provided the proportions are adjusted for each individual case to produce the low charge, preferably essentially zero or slightly negative or positive. The dilution in the media, such as water, in which the reaction takes place should be such so that colloidal particles are produced. As the reaction solution becomes more concentrated, the size of the complex particles formed becomes larger, and this preferably does not exceed colloidal size.

The particular charge of these particles will depend upon the various amounts of the cationic and anionic agents employed as well as their anionic and cationic strength. If one is mixing, for example, a cationic and anionic agent of approximately equal strength, a slight excess of an anionic agent will create a negative charge whereas a slight excess of the cationic agent will produce a positive charge. The anionic and cationic agents are preferably added in substantially equivalent amounts or to a substantially neutral pH so that the net charge of the oil aggregate is essentially zero. A fairly wide range of either agent (at least 5 to 10%) is, however, permissible while still producing the low charged suspensions of the invention. If too much of an excess of cationic or anionic agents are used, the suspensions are not stable. They coalesce rather rapidly. The matter of anionic and cationic proportions can easily be checked by determination of the charges with a zeta meter or by observation of their stability. Once the suspension is formed, the particle charge can also be altered by addition of excess anionic or cationic agents without affecting the basic structure.

Mixtures of both anionic of cationic agents can be used and the invention does not prohibit the use of or the addition of other surfactants, such as the non-ionics, so long as they do not interfere with the production of suspensions according to this invention. Surfactants or emulsifying agents which change charges with pH are more difficult to use for this reason.

It is preferable to add and react the cationic and anionic agents in the water. Once the reaction has been completed, the oil can be added thereto which disperses quite readily with mild stirring. Although the agents can be mixed in various manners to form the colloidal suspension, it is preferable to use deionized water, to add the anionic agent first and then add the cationic agent slowly under fairly high shear (Wearing blender types) for a short time. After the colloidal suspension has been formed, it is allowed to come to equilibrium before adding the oil. Although the oil can simply be stirred in, it is again preferable to add the oil slowly under fairly high shear.

The oil (the water-immiscible liquid is always called the oil) in general may be any water-immiscible fluid desired to be suspended. These include the many known oils which are commonly emulsified, such as those disclosed in the ENCYCLOPEDIA OF CHEMICAL TECHNOLOGY by Kirk-Othmer (both editions) under "Emulsions". Some examples include polymerizable and/or cross-linkable monomers, prepolymers, or polymers, silicone oil, corn oil, linseed oil (boiled or raw), etc. Polar oils are preferable. Nonpolar oils, such as mineral oil are difficult to suspend and different emulsifying systems may have to be used. See the text by Rosen (page 242) referred to above, for example. The oil can be added to the colloidal suspension until all of the particles are used up, i.e., attached to the oil droplets. This is preferable since excess particles will normally just settle out. This does no harm, however. Adding excess oil, i.e., above the colloidal particle concentration, is to be avoided, since there will be no particles to surround the additional oil and it will either form a second distinct phase or cause an inversion.

As previously discussed, the dispersions of this invention break and exhaust on to various surfaces depending on the nature of the charge (positive or negative) of the suspended particles and the charge of the surface to which it is being applied. The term "surface" is used herein in the broad sense to include the surfaces not only of the automotive and furniture-type surfaces but the surfaces of particles in general, whether organic or inorganic, such as cement particles or polymeric particles used, for example, in latex or oil paints.

The suspensions of this invention can thus be advantageously used by themselves, or in combination with or as additions to other dispersions or emulsions, for a wide variety of uses, including cleaning and polishing compositions, paints, varnishes, impregnation and preservation of various porous surfaces, such as wood, for cosmetics, as an additive to various hydraulic cements including Portland and Sorel cements, in the industrial oil and wax field as well as in the pharmaceutical and agriculture fields. Dispersions admixed with other conventional suspensions or emulsions do not necessarily retain their structure, but, depending on the charges involved, may "plate out" on the particle contained in the emulsion or suspension to which it is added to alter the properties thereof. A small amount added to a conventional latex paint, for example, increased the scrub resistance, soil repellency and was easier to brush. Functional additives can also be incorporated into the suspensions after or during their preparation. For example, oil soluble anticorrosive materials, bactericides, etc. can be added to the oil before it is suspended or emulsified in the basic particle colloidal solution. Once the suspension has been "set", then additional materials can be added. For example, additional anionic or cationic agents can be added to alter the particle aggregate charge to suit the desired end use or to ready the suspension for the addition of other functional additives either to the internal phase or adsorbed or attached to the outside surface of the particle aggregates. The addition of charge changing materials does not affect the basic stable suspension structure. The charge change is believed to occur simply by dissociation of the solid colloid aggregate surrounding the internal phase liquid droplets, such as by replacement of sodium ions. A wide variety of additional functional components can be employed and deposited or plated out, including antitarnish, anticorrosion, antistatic, bactericidal, fungicidal, herbicidal agents, abrasives and lubricants, such as FeSi, carbon, graphite, molydisulfide, etc. Most any function added can be incorporated into the suspensions.

Example I(a) and (b) illustrate one manner in which alteration of the charge can be advantageous. Most surfaces have a low charge and the charge on the surface to which the suspensions are to be applied can also be altered if desired. Such surface charge alteration procedures are known in the art. Plastic surface charges, for example, can be changed by treatment with various acids.

EXAMPLE I

A basic solution or colloid was prepared by adding 50 g of a 30% solution of Lomar D to 200 ml of deionized water. 30 g of a 20% solution of Warcofix are then added slowly under high shear. The mixture was then allowed to come to equilibrium.

(a) 150 ml of water and 200 ml of boiled linseed oil is then dispersed under high shear in 50 g of the basic colloid dispersion prepared above. A stable oil and water dispersion resulted. This dispersion had a slightly positive charge, about +5 mv. When diluted (3–4 tablespoons in a pail of water) and applied to both paint and glass surface, the linseed oil immediately plated out on both surfaces and tenaciously adhered thereto rendering both surfaces highly hydrophobic. Numerous glass beads immediately appeared on top of the oil film which was plated out. These water beads can be allowed to remain and evaporate or they can be wiped off with an appropriate cloth. It is advantageous to wash the film with water to remove any excess oil.

(b) 10 g of a 30% solution of Lomar D was then added to 65 g of the linseed oil dispersion prepared in (a) above changing the charge from slightly positive to slightly negative. The dispersion was stable and was diluted with water, 3 to 4 tablespoons to a pail of water. This was applied to both the windshield and the painted surfaces of an automobile. When rinsed with water or hosed off, the painted surface was very hydrophobic with no significant evidence of an oily residue, while the glass windshield remained completely water wettable. On inspection it was found that a microfilm of oil penetrated the surface of the aged painted surface of the automobile and the color was restored to a significant extent. The painted surface was, in effect, regenerated since the linseed oil slowly hardens.

1% to 2% by weight of silicone oil can be added to the above linseed oil suspension which gives additional shine and water repellency to the deposited films. Other o/w dispersions can be prepared in the same manner substituting other polar oils, such as silicone or corn oil for the linseed oil.

EXAMPLE II 5 g of a 30% aqueous solution of Lomar D is dispersed in 200 grams of boiled linseed oil and then 5 grams of a 20% solution of Warcofix is added under fairly high shear. After equilibration 200 grams of deionized water is added under high shear. A w/o suspension results. This w/o suspension can be painted onto surfaces such as wood and acts as an oil paint. It forms a water resistant protective film, but cleans up with water containing a detergent. The suspension has the application and use properties of an oil paint (without organic solvents) while retaining the advantageous properties of a water-base latex paint in cleanup and degree of permiability into the surfaces. Pigments and other materials commonly used in paints can readily be added.

EXAMPLE III 5 parts of FeSi dust is added to the dispersion of Example 1(a). The dust particles adsorbed or attached themselves to the shell of the dispersed oil particles. The product was found to have a powerful cleaning effect especially on old surfaces, such as an "oxidized" automobile finish. The dispersed particles in the composition of Example 1(a) have a slightly positive charge causing the FeSi particles to exhaust thereon. If a negative charge is necessary to cause adsorption of particles onto the shell, the charge can be so changed as illustrated by Example 1(b).

EXAMPLE IV

A dispersion is prepared by adding 150 grams of deionized water and 200 grams of silicone oil SF-96-50 (General Electric Silicone) to 50 grams of the basic colloidal solution prepared in Example I. 5 grams of an alcohol iodine solution (5% $I_2$, 2.5% KI) was then added with stirring. When wiped on surfaces such as plastic or porcelain with a damp sponge, a repellant film containing iodine was formed.

The literature discloses that the addition of oily monomers to cement interferes with the hydration reactions. In contrast thereto, it has been found that addition of the suspensions, particularly the o/w suspensions, of this invention containing oils, such as linseed oil, silicone oil, etc., or monomers, such as butylene dimethacrylate, can be added to Portland cement mixes without interfering with the hydration of the cement grains. The addition of the oils or monomers contained in the suspensions of this invention have also been found to significantly reduce the water permeability of the cured mortar to which they are added. Linseed oil has been found to be most advantageous since it eventually hardens and is much less expensive than silicone oil.

The use of the suspensions of the invention in the preparation of cements, particularly with hydraulic cements, such as Portland and Sorel-type cements, have produced very advantageous and highly unexpected results. The unique stability of the oil particle aggregates and their low charge enables them to maintain their stability in an environment of water and Portland cement thus preventing deposition or plating out of the oil particles on the cement grains and inhibiting the hydraulic process. However, after the water supply has been depleted sufficiently by the hydraulic reaction taking place, the particles or "bubbles" burst, releasing the oil which penetrates or plates out on the particles or cement gel from within.

Sorel cement is a term used to refer to various cured compositions having as basic ingredients a combination of magnesia (MgO) and magnesium chloride ($MgCl_2$). This basic Sorel system when cured is preferred to as a magnesium oxychloride hydrate.

EXAMPLE V

A premix is first prepared by adding 0.7 kg of 85% phosphoric acid to 5.8 kg of water and then 6.7 kg of natural magnesia (MgO). The ingredients in the premix are thoroughly stirred and allowed to age or react until substantially all of the phosphoric acid has been used up as described and claimed in Ser. No. 202,691, filed Oct. 31, 1980 referred to above and which is incorporated herein by reference.

13.8 kg of magnesium chloride hexahydrate, 7.8 kg of magnesium oxide and 19.6 kg of dolomite flour are then added to the premix in the order stated. 2.7 kg of lead carbonate is then predispersed with 1.2 kg of a linseed oil emulsion and this predispersion is then added to form the final composition.

The linseed oil emulsion is prepared by adding 50 grams of a 30% solution of an anionic sulfonated naphthalene-formaldehyde condensation product (sodium salt) marketed by Diamond Shamrock Corporation under the trade name Lomar D to 200 grams of deionized water. 100 grams of a cationic agent, dicyandiamide formaldehyde hydrochloride condensation product marketed by the Sun Chemical Corporation, under the trade name Warcofix 809, is then slowly added under high shear. 200 grams of boiled linseed oil in 150 grams of deionized water is then added to 50 grams of the above mix under high shear. 62 grams of a 30% solution of Lomar D, referred to above, is then added with gentle stirring. 1.2 kg of this final mixture was then mixed with 2.7 kg of lead carbonate and added to the formula mix described above.

The above formula is sprayed along with 5% chopped glass fiber onto a form and covered with a Mylar film. The composition was then allowed to cure for 16 hours at room temperature. The panel is then removed from the form.

A tin composition is then prepared by mixing 100 parts of water with 5 parts by weight of magnesia. This is allowed to stand for two hours and the supernatant liquid then decanted. 86 parts by weight of the above mixture is then mixed with 1.3 parts by weight of stannous chloride dihydrate ($SnCl_2.2H_2O$) together with 20 grams of an acrylic latex (approximately 30% solids). The panel is then dipped into the above composition for one minute and after removing therefrom the wet panel is covered with a plastic film to prevent premature drying and to allow the tin reaction to go to completion.

The panel was then subjected to a weathering test which comprises spraying the panel with water for one hour, freezing for one hour, thawing for one hour, and then drying under infrared and ultraviolet light for one hour. The four steps comprising a total of four hours. This accelerated weathering test was carried out for a period of four months. After the four-month period the panel was found to exhibit little if any deleterious effects under these strenuous weathering conditions. The panels were also cycled in an air oven to dryness and submerged in water for 2 to 3 days with no adverse affects.

All of the above results are not due to the use of the linseed oil suspension. The resistance to running water, for example, is due to the tin treatment. The lead carbonate plus its addition via the suspension is responsible for the resistance to water immersion. The addition of the lead compounds to the Sorel composition in other manners is not nearly as effective in imparting water resistance to the composition as the use of the lead-linseed oil suspension. The lead carbonate appears to remain stable in the mixture until much of the water is used up and then plates out on the gel particles from the inside, thus causing extremely effective water resistance to submersion of the final cured cement. The use of linseed oil alone has little effect and, in fact, interferes with the hydration reaction as noted in the prior art.

The lead compounds used in accordance with this aspect of the invention are those which are capable of reacting with magnesium chloride and are water insoluble. Further examples of such lead compounds include $PbCl_2$, $PbO$, $Pb_2O_3$, $PbS$, and $Pb_3O_4$. Mixtures can be used.

The amount of lead compounds can vary within fairly wide limits. The amount will depend, of course, upon the particular lead compound selected for use, the extent of its water solubility in insolubility, and the extent of the water resistance desired, etc., as will be apparent to those skilled in the art. The amount of lead compounds should be sufficient to react with substantially all of the magnesium chloride remaining unreacted in the product after it has been cured. Generally between about 5 and 20 parts by weight of lead metal based on the 100 parts of the magnesium chloride ($MgCl_2$), not the hydrate, is sufficient to impart excellent water resistance to the cured product. Higher amounts only add to the expense of the process without producing any significant improvement in the water resistance in the cured cements. Substantial amounts of the lead compounds in excess of that which will slowly react with the magnesium chloride not consumed by the magnesium oxide only tend to dilute the product and act as a filler. The minimum amount necessary to accomplish the desired water resistance should be used because of both cost and toxicity factors. In many cases an actual increase in hardness has been observed after long exposure, such as by immersion, in water when the lead compounds are employed.

EXAMPLE VI

A linseed oil dispersion (A) was prepared by mixing (1) 10 parts by weight of a 30% solution of an anionic naphthalenesulfonic acid-formaldehyde condensate (Tamol SN, marketed by Rohm & Haas Co.) with 93 parts by weight of deionized water and (2) 3.5 parts by weight of a 20% solution of a dicyandiamid-formaldehyde hydrochloride condensate cationic agent (Warcofix) with 99 parts by weight of deionized water. Solutions (1) and (2) were added simultaneously and rapidly under high shear to 200 parts by weight of boiled linseed oil containing driers. 100 parts by weight of deionized water was then added and a stable o/w suspension was formed.

Another dispersion (B) was also prepared as above substituting 4 parts by weight of a silicone oil (General Electric SF96-1000) for 4 parts of the linseed oil.

The following formulations were then prepared (parts by weight):

| | | | |
|---|---|---|---|
| Cement (Norcem Rapid) | 300 | 300 | 300 |
| Sand | 600 | 600 | 600 |
| Linseed oil dispersion (A) | | 30 | |
| Silicone oil modified dispersion (B) | | | 30 |

All formulations used the same amount of water, the water in the dispersions being taken into account.

The formulations were cured into standard test bars. Two bars of each formulation were cured in a mold for 24 hours, removed from the mold and the length measured. One sample was stored in air and the other submerged in water. After one week the submerged bars were removed from the water and stored in air. The length of the bars were periodically measured. The control stored in air had a percent lineal change after 2, 4, 6, 12 and 18 days of about $-0.055$, $-0.08$, $-0.095$, $-0.11$ and $-0.12$. The air stored bars incorporating dispersion (A) had percent lineal changes of about $-0.01$, $-0.02$, $-0.03$, $-0.04$ and $-0.02$ on the same days. The percent changes using suspension B on the same days were about $-0.01$, $-0.015$, $-0.02$ and $-0.045$ (no 18-day reading taken). In water all samples showed substantially the same change of about $+0.02$ after seven days. After water removal to air, the control showed a percent change of $-0.03$ five days later, and on the 11th day in air $-0.07$. The bar produced with suspension (A) showed similar change of $-0.015$ and $-0.03$ on the same days. The bar produced with solution (B) showed a shrinkage of $-0.005$ on the fifth day out of water with no further measurements being made. These data show that the use of the suspension of this invention significantly lessen the shrinkage problem of Portland cement with out affecting its strength or interfering with the hydration reaction.

EXAMPLE VII

The following formulations are prepared:

| | Control | Composition X | Composition Y |
|---|---|---|---|
| Cement | 100 | 100 | 95 |
| Sand | 250 | 250 | 250 |
| Water | 40 | 38.8 | 37.5 |
| | 390 | — | — |
| Norwegian lime | — | — | 5.0 |
| Dispersion Example I(a) | | 2.4 | 5.0 |
| | | 391.2 | 397.5 |

All compsositions have the same water-to-cement ratio.

The linseed oil dispersion suspension of Example I(a) constitutes an oil addition of 1.2 parts per 100 parts of cement. Composition Y has 5 parts of untreated lime along with 5 parts of the linseed oil suspension of Example I(a) containing 2.5 parts of oil per 100 parts of cement. With regard to composition Y, the lime was added to the linseed oil suspension before addition to the mortar slurry. After continuous suspension in water for three months, the percent length change of the control was $+0.02$ while under the same conditions the percent length change of the composition Y was $+0.23$. When stored for three months at a relative humidity of between about 30% to 50%, the percent length change of the control was $-0.15$ while that of composition Y was $-0.01$. On cycling (24 hours submerged in water and then 24 hours in an oven at 60° C.) after one month the control, when wet, measured 99% based on the weight percent of the original slurry when wet, and 93% when dry. The respective figures of composition Y, however, were 90% and 87.5%. Composition Y showed elimination of drying shrinkage without development of unsoundness which is generally the result when lime is used. Composition X showed a very low absorption of water between cycles exhibiting about one-third the permeability of water as compared to the control.

The positive effect of using the linseed oil suspension of Example I(a) in combination with lime is caused by an inhibition of lime hydration due to the presence of the linseed oil suspension. Hydration (and thus expansion) of the lime is retarded sufficiently so that it takes place concurrently with the hardening of the mortar. At the same time the lowered permeability reduces the loss of free water which is essential for slaking of the lime.

Although the composition of Example I(a) is effective, the negative charge suspension of Example I(b) has been found to be still more effective in limiting lime hydraulysis. For example, a dolomitic quicklime marketed by Flintkote Corp. reacts violently with water within 30 seconds. When mixed with the formulation of Example I(b) in equal proportion, a very slow reaction starts to take place about 2½ hours after mixing with water.

EXAMPLE VIII

The linseed oil used to form the suspension in Example I(b) was substituted by a butylene dimethacrylate monomer (along with separately added catalysts). This suspension was then added to a mortar mix corresponding to composition X in place of the Example I(a) dispersion. The dispersion was added in an amount corresponding to a monomer content of about 1.2 parts by weight per 100 parts of cement. An internal impregnation resulted followed by a polymerization caused by the added catalyst without any undesirable retardation in the basic hydraulic process. Previous experience with monomer additions with cement mortar has resulted in a decrease in the amount of hydration as measured by the percentage of combined water and a corresponding decrease in strength. See "Premix Copolymer Cement Materials" by D. J. Cook et al. in CEMENT AND CONCRETE RESEARCH, Vol. 6, pages 235-244 (1976) Pergamon Press, Inc. The added catalysts can be thus disclosed in the above pulication.

EXAMPLE IX

A Portland cement composition was prepared by mixing 93 parts by weight of cement, 270 parts by weight of sand (containing 3.6% water), and 33 parts by weight water. 7 parts by weight of cement were them mixed with 5 parts by weight of the suspension of Example I(b) (2.2 parts oil). This suspension was then mixed with the cement and the composition allowed to cure for 24 hours. After curing, storage in water showed a percent expansion of 0.02 after about 17 days. When removed from water and exposed to air, the composition showed a percent shrinkage of about 0.015% after about 23 days in air. The sample stored in air after 12 days showed a percent shrinkage of about 0.03, and after 17 days the percent shrinkage remained at about the same. When taken out of the air and immersed in water, the composition gradually expanded and showed a net percent shrinkage of about 0.01% after 30 days.

A control, utilizing the same amount of cement, water and sand but without the linseed oil suspension, showed substantially the same expansion in water, but the sample exposed to air showed a percent shrinkage in excess of 0.1% after about 17 days and the shrinking gradually increased over a period of 30 days.

The products were also tested by immersing them in water and drying them in a 60° C. oven for 20 days and measuring the wet and dry weights. The percentage is base on the weight of the mortar before curing. The control varied from 100% to 99% of the weight of the wet mortar after water immersion and between 90% and 93% after oven curing; the differential being 6 to 9 percentage points. The composition utilizing the linseed oil suspension rapidly came down to a wet weight of about 95% after 9 days and was fairly stable up to 22 days varying between about 95% of the original weight of the mortar when wet and 92.5% of the original weight of the mortar after having been dried in the oven representing a differential of about 2.5 percentage points. The reduced weight loss as shown by the linseed oil composition is indicative of higher conversion of cement to hydrate. The resulting structure is much less permiable to water. The shrinking data referred to above shows that the use of the linseed oil suspensions can virtually eliminate drying shrinkage without resorting to shrinkage compensating expansion agents and also reduce or eliminate the danger of unsoundness.

A similar experiment was carried out utilizing 93 parts by weight of cement, 270 parts by weight sand (3.6% water) and 33 parts by weight water. 7 parts by weight of the linseed oil suspension of Example I(b) (3.1 parts oil) were mixed with 7 parts by weight of untreated calcined lime. This mixture was then added to the mortar and the mortar cured for 24 hours. When stored in water the cured cement expanded to approximately 0.05% after about 5 days and remained at this percentage for about 20 days. The sample cured in air at first showed a slight expansion (about 0.015) and then gradually began shrinking and exhibited a percent shrinkage of about 0.3% after 20 days.

When the same composition was cured for 24 hours utilizing the lime alone, it became unsound after a few days storage under water. When stored in air the sample shrank about 0.06% after about 5 to 6 days and then gradually began to expand and became unsound in three months. This test shows that untreated lime can be used with the oil suspensions of this invention to substantially reduce drying shrinkage without encountering unsoundness.

I claim:

1. A method of forming a cement which comprises mixing hydratable cement particles with water in conventional proportions and adding thereto before curing an oil-in-water suspension in which the oil droplets are surrounded by colloidal particles comprising the reaction product of at least one anionic agent and at least one cationic agent, said particles having a zeta potential of between about $+18$ and $-18$ millivolts.

2. The method of claim 1 in which the cement is Portland cement.

3. The method of claim 2 in which the oil is linseed oil, silicone oil, a polymerizable monomer or mixtures thereof.

4. The method of claim 1 in which the oil is linseed oil.

5. The method of claim 3 wherein said polymerizable monomer is butylene dimethacrylate.

6. The method of claim 1 wherein the colloidal particles have a zeta potential of between about $+10$ and $-10$ millivolts.

7. The method of claim 1 wherein the colloidal particles have a zeta potential of about 0 milivolts.

8. The method of claim 1 in which the cement is a Sorel cement.

9. The method of claim 8 wherein the oil suspension contains a water insoluble lead compound.

10. The method of claim 9 wherein the lead compound comprises $PbCl_2$, $PbO$, $Pb_2O_3$, $PbS$, $PbCO_3$, $Pb_3O_4$ or mixtures thereof.

11. A method of forming a Portland or Sorel cement which comprises mixing hydratable Portland or Sorel cement particles with water in conventional proportions and adding thereto before curing a linseed oil-in-water suspension in which the linseed oil droplets are surrounded by colloidal particles comprising the reaction product of at least one anionic agent and at least one cationic agent, said particles having a zeta potential between about $+10$ and $-10$ millivolts.

12. The method of claim 11 wherein the cement is a Sorel cement and the linseed oil-in-water suspension contains $PbCl_2$, $PbO$, $Pb_2O_3$, $PbS$, $PbCO_3$, $Pb_3O_4$ or mixtures thereof.

13. A cement composition comprising a cured mixture of hydratable cement particles, water, and an oil-in-water suspension in which the oil droplets are surrounded by colloidal particles comprising the reaction product of at least one anionic agent and at least one cationic agent, said particles having a zeta potential of between $+18$ and $-18$ millivolts.

14. The cement composition of claim 13 wherein said cement is Portland cement.

15. The cement composition of claim 13 wherein said oil is a linseed oil, a silicone oil, a polymerizable monomer, or mixtures thereof.

16. The cement composition of claim 13 wherein said zeta potential is between about $+10$ and $-10$ millivolts.

17. The composition of claim 13 wherein said cement is a Portland cement, said oil is butylene dimethacrylate, and said zeta potential is about zero millivolts.

18. The composition of claim 13 wherein the cement is a Sorel cement and the linseed oil-in-water suspension contains $PbCl_2$, $PbO$, $Pb_2O_3$, $PbS$, $PbCO_3$, $Pb_3O_4$ or mixtures thereof.

19. A method for reducing the drying shrinkage of a Portland cement composition which comprises adding to said Portland cement composition, before curing, a sufficient amount of a linseed oil-in-water suspension wherein the linseed oil droplets are surrounded by colloidal particles comprising the reaction products of at least one anionic agent and at least one cationic agent, said particles having a zeta potential between about +18 and −18 millivolts.

20. The method of claim 19 wherein said zeta potential is between about +10 and −10 millivolts.

21. A method for reducing drying shrinkage in cementitious compositions which comprises: forming a cement by mixing hydratable cement particles with water in conventional proportions; adding to the cement before curing an oil-in-water suspension in which the oil droplets are surrounded by colloidal particles comprising the reaction product of at least one anionic agent and at least one cationic agent, said particles having a zeta potential of between about +18 and −18 millivolts; and allowing the cement to cure.

22. The method according to claim 21 wherein the colloidal particles have a zeta potential of between about +10 and −10.

23. The method according to claim 21 wherein the collidal particles have a zeta potential of about 0 milivolts.

24. The method of claim 21 wherein the cement is a Sorel cement, the oil is linseed oil, and the linseed oil-in-water suspension contains $PbCl_2$, $PbO$, $Pb_2O_3$, $PbS$, $PbCO_2$, $Pb_3O_4$ or mixtures thereof.

* * * * *